United States Patent
Cheong et al.

(10) Patent No.: US 7,769,100 B2
(45) Date of Patent: Aug. 3, 2010

(54) METHOD AND APPARATUS FOR CANCELLATION OF CROSS-TALK SIGNALS USING MULTI-DIMENSIONAL COORDINATION AND VECTORED TRANSMISSION

(75) Inventors: Min-Ho Cheong, Daejeon (KR); Hyeong-Jun Park, Daejeon (KR); Yong-Hwan Lee, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 797 days.

(21) Appl. No.: 11/636,711

(22) Filed: Dec. 11, 2006

(65) Prior Publication Data
US 2007/0133723 A1    Jun. 14, 2007

(30) Foreign Application Priority Data
Dec. 10, 2005  (KR)  ............... 10-2005-0121375
Nov. 24, 2006  (KR)  ............... 10-2006-0116952

(51) Int. Cl.
*H04B 15/00* (2006.01)
(52) U.S. Cl. .................................................. 375/285
(58) Field of Classification Search ............... 375/147, 375/231, 254, 285, 295, 296, 340, 346, 350, 375/136, 260; 370/201, 268, 286, 410, 205, 370/210, 260, 338
See application file for complete search history.

(56) References Cited

U.S. PATENT DOCUMENTS

| | | | |
|---|---|---|---|
| 6,859,508 B1 | 2/2005 | Koyama et al. | |
| 2002/0027985 A1 | 3/2002 | Rashid-Farrokhi | |
| 2002/0126773 A1* | 9/2002 | Brunel | 375/340 |
| 2003/0086362 A1 | 5/2003 | Hasegawa | |
| 2003/0086514 A1* | 5/2003 | Ginis et al. | 375/346 |
| 2003/0185310 A1 | 10/2003 | Ketchum et al. | |
| 2004/0090927 A1 | 5/2004 | Zimmerman et al. | |
| 2004/0252755 A1 | 12/2004 | Jaffe et al. | |
| 2005/0152385 A1 | 7/2005 | Cioffi | |

FOREIGN PATENT DOCUMENTS

WO   WO 2005/076554   8/2005

* cited by examiner

*Primary Examiner*—David C Payne
*Assistant Examiner*—Syed Haider
(74) *Attorney, Agent, or Firm*—Lowe Hauptman Ham & Berner LLP (57) ABSTRACT

In a method of canceling crosstalk signals, decoding or precoding through a diagonal channel analysis of the user domain and the time domain is performed, in addition to decoding or precoding in the user and time domains.

20 Claims, 7 Drawing Sheets

METHOD AND APPARATUS FOR CANCELLATION OF CROSS-TALK SIGNALS USING MULTI-DIMENSIONAL COORDINATION AND VECTORED TRANSMISSION

BACKGROUND OF THE INVENTION (a) Field of the Invention

The present invention relates to a method and an apparatus for cancellation of crosstalk signals using multi-dimensional coordination and vectored transmission. More particularly, the present invention relates to a method and an apparatus for cancellation of transmitted crosstalk signals by applying vectored transmission and multi-dimensional cable coordination to time and space through a sequential operation using a DFE (decision feedback equalizer) or preceding.

(b) Description of the Related Art

A digital subscriber line (DSL) technology provides transport of high-bit-rate digital information over public telephone lines. Recently, a new technique has been proposed to increase the overall data rate by coordinating all the lines in the same DSL cable.

Since crosstalk in DSL communication causes problems such as noise, the new technique causes many problems in a plurality of multi-user digital communication systems. For this reason, continuous and sub-optimal technologies are currently being used to cancel the crosstalk. The technologies for canceling the crosstalk affect transmission performance rather than bringing about operational improvement in the corresponding system.

The crosstalk problem has been researched in various contexts, such as in multi-channel signal processing and in using a corresponding minimum mean square error (MMSE) linear equalizer. In the absence of user coordination, transmitters of broader scope than Nyquist transmitters have been shown to provide a performance advantage over Nyquist-limited transmitters.

Recently, Cioffi proposed a modulation scheme that can cancel out FEXT (far-end crosstalk) by jointly processing the user signal at both the receiver and transmitter.

Figure 1:
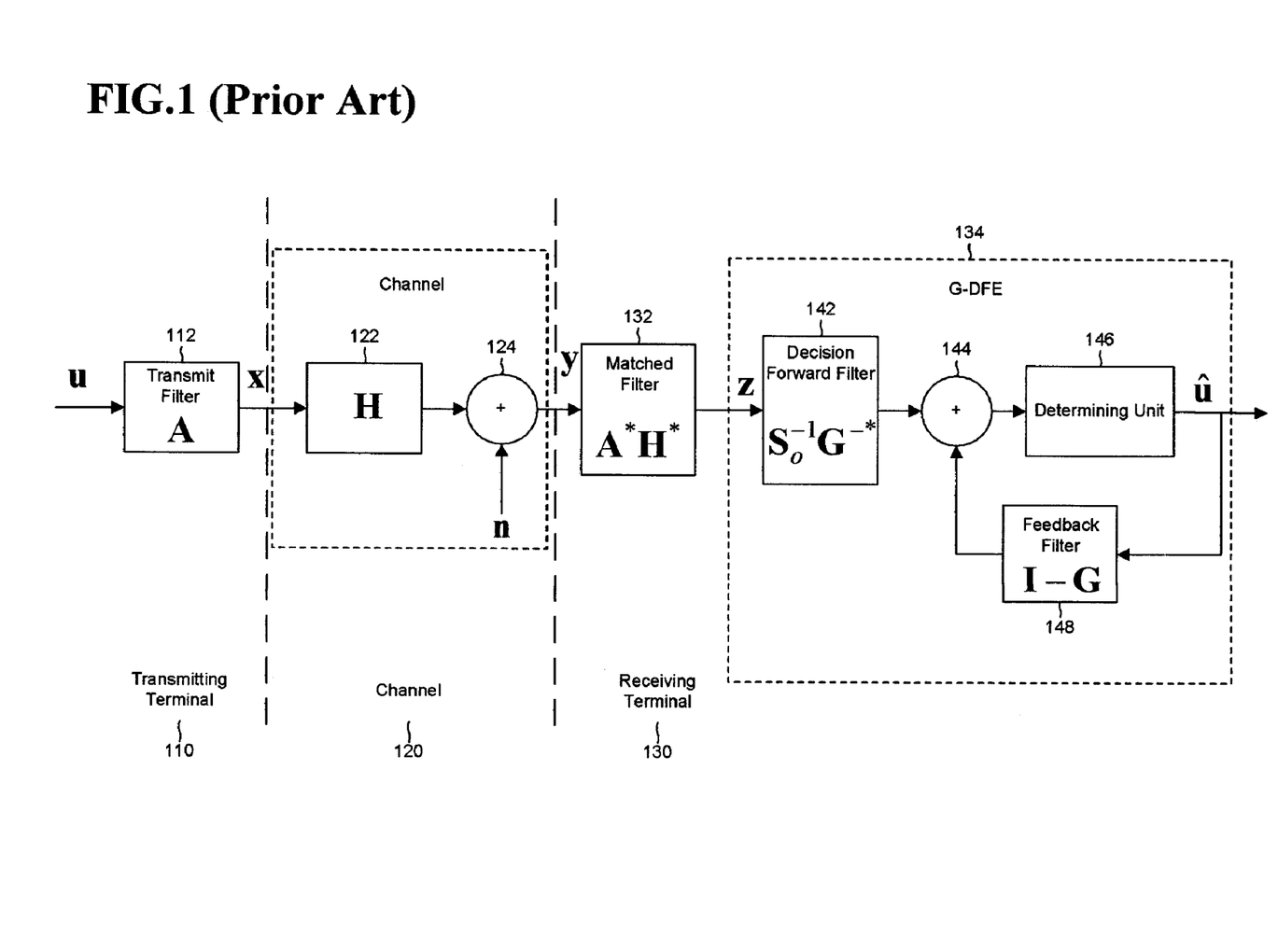
FIG. 1 is a diagram illustrating a data transmission structure between a DSL reception terminal and a DLS transmission terminal using a generalized decision feedback equalizer (G-DFE).

FIG. 1 is a diagram illustrating a data transmission structure between a DSL reception terminal and a DLS transmission terminal using a generalized decision feedback equalizer (G-DFE).

The data transmission structure using the G-DEF mainly includes a transmitting terminal 110 and a channel 120, and a receiving terminal 130.

The transmitting terminal 110 includes a transmission filter 112, and the transmission filter 112 includes a pre-distortion matrix A derived by a matched filter 132 of the receiving terminal 130. The u that is input to the transmission filter 112 is the pre-distorted data vector, and the signal that passes through the transmission filter 112 and is transmitted through the channel 120 is represented as x.

The channel 120 that transmits a signal between the transmitting terminal 110 and the receiving terminal 130 has an entire channel matrix H in a DSL cable. Further, an n value that is a noise vector is added to the signal transmitted through the channel 120. Therefore, the signal x transmitted from the transmitting terminal 110 is multiplied by a value of the entire channel matrix H, is added by the noise vector n, and is transmitted to the receiving terminal 130. That is, if the signal received by the receiving terminal 130 is assumed as y, the y is represented as Equation 1.

$$y = Hx + n \quad \text{(Equation 1)}$$

The receiving terminal 130 includes the matched filter 132 and the G-DFE 134.

The matched filter 132 is a filter constructed using the entire channel matrix value H and the pre-distortion matrix value A of the transmission filter 112 in order to reliably receive the signal transmitted from the receiving terminal 130, and has an $A^*H^*$ value. The signal that has passed through the matched filter 132 is represented as z, and the z is represented as Equation 2.

$$z = R_f u + n' \quad \text{(Equation 2)}$$

In this case, $R_f$ is $A^*H^*HA$ and n' is $A^*H^*n$. In addition, covariance of the noise n satisfies the condition $R_{nn} = R_f$. At this time, if Cholesky factorization is applied to $R_f$, it is represented as Equation 3.

$$R_f = G^{**}S_0 G \quad \text{(Equation 3)}$$

In this case, $S_o$ is a diagonal matrix having a positive element, and G is a monic upper triangular matrix. At this time, when processing a z vector using $S_o^{-1} G\_*$ as an inverse matrix of $G^*S_o$, it is represented as Equation 4.

$$S_0^{-1}G^{-*}z = Gu + S_0^{-1}G^{-*}n' = Gu + e \quad \text{(Equation 4)}$$

In this case, G is an upper triangular matrix and an error e has uncorrelated components. In addition, the input signal u can be recovered by back-substitution combined with symbol-by-symbol detection. Accordingly, the G-DFE 134 having a decision feedback structure can be constructed to include a forward filter $S_o^{-1}G^{-*}$ 142 and a feedback filter 1-G 148, as shown in FIG. 1. Further, the G-DFE 134 includes an adding unit 144 that adds a feedback signal transmitted from the feedback filter 148 and a signal transmitted from the decision forward filter 142 and a determining unit 146 that restores u^ that is similar to the input signal u according to the signal transmitted from the adding unit 144.

In the structure of the G-DFE 134, the pre-distortion matrix A of the transmission filter 112 is represented as Equation 5.

$$A = Q_{mIDFT}P \quad \text{(Equation 5)}$$

In this case, $Q_{mIDFT}$ denotes an L-D expansion of a discrete Fourier transform (DFT) matrix $Q_{IDFT}$ with N tones, and P denotes an L-D expansion of a permutation matrix. Therefore, $R_f$ is factorized as Equation 6.

$$R_f = P^*Q_{mDFT}H^*HQ_{mIDFT}P \quad \text{(Equation 6)}$$

At this time, when it is assumed that $H_{i,j}$ is a circulant matrix of an entire channel matrix H, the condition $H_{i,j} = Q_{IDFT}\Lambda_{i,j}Q_{DFT}$ is satisfied. In this case, since $\Lambda_{i,j}$ is a diagonal matrix, Equation 6 can be represented as Equation 7.

$$Rf = P^*\Lambda^*\Lambda P \quad \text{(Equation 7)}$$

In this case, $\Lambda i,j$ is the (i,j)-th element of $\Lambda$. The reordering $R_f$ by P results in a block diagonal matrix as Equation 8.

$$R_f = \text{diag}(R_{f,1}, R_{f,2}, \ldots, \text{and } R_{f,N}) \quad \text{(Equation 8)}$$

In this case, $R_{f,i}$ (i=1, 2, ..., N) is an (L×L)-D matrix. At this time, the Cholesky factorization of $R_f$ is represented as Equation 9.

$$R_f = \text{diag}(G_1^*S_{o,1}G_1, G_2^*S_{o,2}G_2, \ldots, \text{and } G_N^*S_{o,N}G_N) \quad \text{(Equation 9)}$$

In addition, the decomposition as in Equation 10 is derived from Equation 9.

$$P^*\Lambda P = \text{diag}(Q_1R_1, Q_2R_2, \ldots, \text{and } Q_NR_N) \quad \text{(Equation 10)}$$

At this time, $Q_i$ (i=1, 2, ..., N) is a unit matrix of (L×L)-D and $R_i$(i=1, 2, ..., N) is an upper triangular matrix of (L (L)-D. Simple substitution proves the condition $$R_i = S_{0,i}^{-\frac{1}{2}} G_i.$$

Meanwhile, in the G-DFE 134, the feedback filter G=diag $(G_1, G_2, \ldots, G_N)$ can be separated into N independent feedback filters, each of which operates at each tone. Here, the combination of the matched filter 132 and the decision forward filter is as Equation 11.

$$S_0^{-1}G^{-*}A^*H = S_0^{-1}G^{-*}P^*\Lambda^*Q_{mDFT} = S_0^{-1}G^{-1}P^*\Lambda^*PP^*Q_{mDFT} \quad \text{(Equation 11)}$$

Equation 12 is derived from Equation 11.

$$S_0^{-1}G^{-*}A^*H^* = S_0^{-1}G^{-*}diag(R_1^*Q_1^*, R_2^*Q_2^*, \cdots, R_N^*Q_N^*) \quad \text{(Equation 12)}$$

$$P^*Q_{mDFT}$$

$$= S_0^{-1}G^{-*}diag\left(G_1^*S_{o,1}^{\frac{1}{2}}, G_2^*S_{o,2}^{\frac{1}{2}}, \cdots, G_N^*S_{o,N}^{\frac{1}{2}}\right) \cdot$$

$$diag(Q_1^*, Q_2^*, \cdots, Q_N^*)P^*Q_{mDFT}$$

$$= diag\left(S_{o,1}^{\frac{1}{2}}, S_{o,2}^{\frac{1}{2}}, \cdots, S_{o,N}^{\frac{1}{2}}\right) \cdot$$

$$diag(Q_1^*, Q_2^*, \cdots, Q_N^*)PQ_{mDFT}$$

However, as described above, there is a problem in the data transmission structure between the DSL reception terminal and the xDSL service in which a type of a cable line is different. Further, there is a problem in that near-end crosstalk (NEXT) occurs.

SUMMARY OF THE INVENTION

The present invention has been made in an effort to provide a modulation structure and method of a multi-dimensional decision-feedback equalizer (M-D DFE) and multi-dimensional precoding (M-D precoding), having advantages of applying vectored transmission and multi-dimensional cable coordination to time and space through a sequential operation using a DFE or precoding and canceling near-end crosstalk (NEXT) and far-end crosstalk (FEXT).

A method of canceling crosstalk signals in a receiver according to a first exemplary embodiment of the present invention is a method of canceling crosstalk signals in a receiver that receives data vectors transmitted from a transmitter and received signals including the crosstalk signals generated during the transmission of the data vectors. The method includes (a) a step of multi-dimensionally decomposing the received signals into a user domain and a time domain, (b) a step of calculating a transposed matrix and a diagonal matrix of a unit matrix from the received signals, (c) a step of decoding the received signals with respect to symbols taking the user domain using the transposed matrix and the diagonal matrix of the unit matrix, and (d) a step of decoding the signal decoded in the user domain with respect to symbols taking the time domain so as to calculate the data vectors from which the crosstalk signals are cancelled.

An apparatus for canceling crosstalk signals in a receiver according to a first exemplary embodiment of the present invention is an apparatus for canceling crosstalk signals in a receiver that receives data vectors transmitted from a transmitter and received signals including the crosstalk signals generated during the transmission of the data vectors. The apparatus includes a decision forward filter that calculates a transposed matrix and a diagonal matrix of a unit matrix from the received signals, a determining unit that calculates the data vectors included in the received signals using the transposed matrix and the diagonal matrix of the unit matrix, a feedback filter that feeds back the data vector calculated by the determining unit, and an adder that adds the data vectors fed back through the feedback filter and the received signals transmitted from the decision forward filter and transmits the sum to the determining unit.

A multi-user transmission system that cancels crosstalk signals according to a first exemplary embodiment of the present invention is a multi-user transmission system that cancels crosstalk signals generated during the transmission of signals using a multi-dimensional decision feedback equalizer (DCE). The system includes a plurality of discrete multi-tone (DMT) transmitters that transmit a plurality of transmission signals including data vectors input from a plurality of users through a transmission channel, a plurality of DMT receivers that receive a plurality of signals from the transmission channel, the plurality of received signals including the plurality of transmission signals transmitted from the plurality of DMT transmitters and the crosstalk signals generated during the transmission of the plurality of transmission signals, and a plurality of cancellers that cancel the crosstalk signals from the plurality of received signals so as to calculate the data vectors.

A method of canceling crosstalk signals in a transmitter according to a second exemplary embodiment of the present invention is a method of canceling crosstalk signals that are generated during the transmission of data vectors from a transmitter to a receiver. The method includes (a) a step of multiplying the data vectors to be transmitted from a pre-distortion matrix so as to calculate transmission signals, (b) a step of multi-dimensionally decomposing the transmission signals into a time domain and a user domain, (c) a step of precoding the transmission signals in the time domain and precoding the transmission signals in the user domain, (d) a step of multiplying the signals precoded in the time domain and the user domain by the pre-distortion matrix so as to calculate second transmission signals, and (e) a step of multiplying the second transmission signals by the unit matrix and transmitting the result to the receiver.

A crosstalk signal canceling apparatus for a transmitter according to a second exemplary embodiment of the present invention is a crosstalk signal canceling apparatus for a transmitter that cancels crosstalk signals generated during the transmission of data vectors to a receiver. The apparatus includes a transmission module that multiplies the data vectors to be transmitted from a pre-distortion matrix so as to calculate transmission signals, a unit matrix calculating unit that multiplies the transmission signals transmitted from the transmission module by the unit matrix so as to calculate the transmission signals transmitted to the receiver, a precoding feedback filter that performs multi-dimensional precoding of the transmission signals calculated by the transmission module so as to generate feedback signals for cancellation of the crosstalk signals, and an adder that adds the feedback signals transmitted from the precoding feedback filter and input data vectors and transmits the result to the transmission module.

A multi-user transmission system that cancels crosstalk signals according to a second exemplary embodiment of the present invention is a multi-user transmission system that cancels crosstalk signals generated during the transmission of signals using a multi-dimensional precoder. The system includes a plurality of precoders that receive input data vectors and perform a process for canceling the crosstalk signals generated during the transmission of the data vectors, a plurality of discrete multi-tone (DMT) transmitters that receive the signals having been subjected to the crosstalk signal canceling process from the plurality of precoders so as to generate transmission signals and transmit the transmission signals through a transmission channel, and a plurality of DMT receivers that receive the plurality of transmission signals transmitted through the transmission channel so as to calculate the data vectors.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

The term "module" used herein means one unit that processes a specific function or operation, and may be implemented by hardware or software and a combination thereof.

In the description below, a multi-dimensional decision-feedback equalizer (M-D DFE) is simply referred to as an "M-D DFE", and multi-dimensional precoding is simply referred to as "M-D preceding".

When one user exists in a data transmission structure between a transmitting terminal and a receiving terminal, a received signal is affected by a previously received signal on a time axis, and thus a receiver can be easily designed, as in a G-DFE according to the related art.

However, in a data transmission structure where a plurality of users exist, a received signal is affected by a signal that is different from a previously received signal and is transmitted from another user. Therefore, when the receiver is designed, the receiver needs to be designed while considering the signal that is different from the previously received signal and is transmitted from another user.

Figure 2:
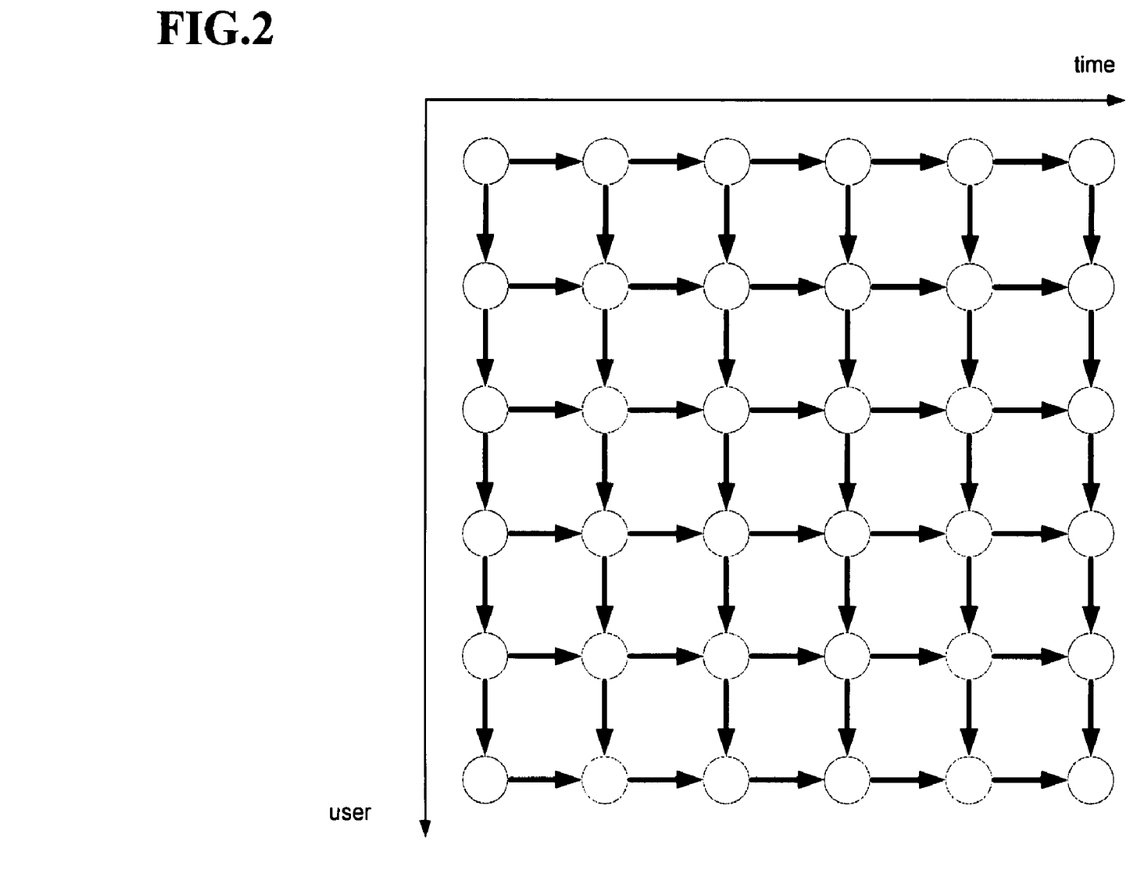
FIG. 2 is a first schematic view illustrating a two-dimensional DFE according to an exemplary embodiment of the present invention.

FIG. 2 is a first schematic view illustrating a two-dimensional DFE according to an exemplary embodiment of the present invention.

If two-dimensional Cholesky factorization is applied to the DFE, the DEF can be represented as in FIG. 2.

In this case, the horizontal direction denotes the time axis, the vertical direction denotes a user axis, and the circular marks denote delayed symbols and other users. Further, arrows that connect the circular marks denote possible consecutive substitutions to cancel inter-symbol interference (ISI) and crosstalk.

If the DSL signal is not modulated by MIMO (multi input multi output) DMT (discrete multi-tone), it cannot be decomposed into one-tap (scalar) representation for each tone. A single-carrier DSL signal can be decomposed into a per-tone multi-tap equalizer structure.

To describe a single-carrier model, on the assumption of the transmission of successive symbols of a user $(X_{1:N}^1)$ at time (t=k−1, k, and k+1), when the k-th symbol is the desired one, the symbol at t=k includes interference form a previous symbol (t=k−1) and a next symbol (t=k−1). Therefore, the received signal is represented as Equation 13.

$$\overbrace{\begin{bmatrix} y_{ks+v-T+2} \\ \vdots \\ y_{(k+1)s} \end{bmatrix}}^{y} = \begin{bmatrix} O_{[1]} & \begin{vmatrix} h0: \\ \ddots \ddots \\ 0 \cdots h \end{vmatrix} & O_{[2]} \end{bmatrix} \cdot \begin{bmatrix} TOO \\ OTO \\ OOT \end{bmatrix} \cdot$$

$$\begin{bmatrix} Q_{IDFT}OO \\ O_{QIDFT}O \\ OOQ_{IDFT} \end{bmatrix} \overbrace{\begin{bmatrix} X_{1:N}^{(k-1)} \\ X_{1:N}^{(k)} \\ X_{1:N}^{(k+1)} \end{bmatrix}}^{x} + \overbrace{\begin{bmatrix} n_{ks+v-T+2} \\ \vdots \\ n_{(k+1)s} \end{bmatrix}}^{n}$$

$$= H \cdot X + n$$

(Equation 13)

At this time, $O_{[1]}$ denotes a zero matrix in (N+T−1)×(N+v−T+1−L+v), and $O_{[2]}$ denotes a zero matrix in (N+T−1)×(N+v−K)−D. In this case, v denotes the length of a guard interval of a far-end signal, the length of a single-carrier symbol as s=W+v, and the channel impulse response in reverse order as h=[$h_L$, ..., $h_0$, ..., and $h_k$]. In addition, T is represented as Equation 14.

$$T = \begin{bmatrix} O | I_V \\ \hline I_N \end{bmatrix}$$

(Equation 14)

At this time, $I_N$ denotes a unit matrix (identity matrix) of (N×N)−D. Therefore, each receiver detects a received signal, as represented as Equation 15.

$$\begin{bmatrix} \hat{X}_1^{(k)} \\ \vdots \\ \hat{X}_N^{(k)} \end{bmatrix} = \begin{bmatrix} D_1 0 \cdots \\ 0 \cdot .0 \\ :0D_N \end{bmatrix} \cdot \frac{1FFT}{Q_{DFT} \cdot (Y \cdot w)}$$

(Equation 15)

At this time, $w=[w_0, w_1, \ldots, $ and $w_{T-1}]$ denotes the real coefficient of the T-tap time-domain equalizer (TEQ), $D_i$ is the 1-tap complex frequency-domain equalizer (FEQ) at the i-th tone, and Y denotes an (N×N) Toeplitz matrix containing the received signal.

Here, Y can be represented as Equation 16.

$$Y = \begin{bmatrix} y_{ks+v+1} \cdots y_{ks+v} y_{ks+v-T+2} \\ y_{ks+v+2} y_{ks+v+1} \cdots y_{ks+v-T+3} \\ \vdots \ddots \vdots \\ y_{ks+v+1} y_{(k+1)-1} \cdots y_{(k+1)s-T+1} \end{bmatrix} \quad \text{(Equation 16)}$$

At this time, one approach according to the exemplary embodiment of the present invention is to convert a single carrier filtering operation into a frequency domain. That is, after the DFT demodulation, at the i-th tone, the single carrier filtering operation ($X_i^{(k)}$) can be represented as Equation 17.

$$X_i^{(k)} = D_i \cdot row_i(F_N) \cdot (Yw) \quad \text{(Equation 17)}$$
$$= row_i \underbrace{QDFT \cdot Y}_{TFFTs} \cdot \underbrace{w \cdot D_i}_{wi}$$

In this case, $row_i[\cdot]$ denotes the i-th column in a matrix, $w \cdot D_i$ denotes the T-tap FEQ at the i-th tone, and the $w \cdot D_i = (w_i)_{T \times 1}$ is satisfied. Each tone is allowed to have its own optimum T-tap FEQ $w_i$. Thus, the receiver needs a multi-tap FEQ equalizer for each tone to receive the single-carrier modulated signal.

From the above description, it can be confirmed that in the receivers for canceling the crosstalk signals that exist among the plurality of users, an optimal M-D DFE needs to be designed in two dimensions where a plurality of symbols, that is, a plurality of users, exist per sub-carrier.

The signal in the coordinated receiver can be represented as a one-tap or multi-tap delay-line symbol for each tone. It is possible to analyze the MIMO channel in the coordinated receiver in the time and user domain.

A two-dimensional DFE structure for optimal design of the two-dimensional MD-DFE is as shown in FIG. 2, which is the same as obtained by expanding the one-dimensional G-DFE into the two-dimensional G-DFE. Here, the two-dimensional DFE is an example of the M-D DFE, and means the M-D DFE that is two-dimensionally constructed.

Therefore, when the one-dimensional G-DFE structure is expanded into the two-dimensional G-DFE structure, a coordinating scheme using the two-dimensional G-DFE can be devised, and a signal sample $$\left(\hat{S}_{i,n}\right)_k$$

and a feedback method $(U_{n,k})_i$ for a cancellation scheme can be represented as Equations 18 and 19, respectively. In this case, the signal sample $$\left(\hat{S}_{i,n}\right)_k$$

means the intermediate decoded sample only after the G-DFE in the user domain.

$$\left(\hat{S}_{i,n}\right)_k = dec\left[\frac{1}{r_{k,k}^{i,n}}(\tilde{Z}_{i,n})_k - \sum_{j=n+1}^{N} \frac{r_{k,j}^{i,n}}{r_{k,k}^{i,n}}(\hat{S}_{i,j})_k\right], \quad \text{(Equation 18)}$$
$$n = T, T-1, \ldots, \text{ and } 1$$

$$\left(U_{n,k}\right)_i = dec\left[\frac{1}{r_{k,k}^{j}}(\hat{S}_i)_k - \sum_{j=k+1}^{L} \frac{r_{k,j}^{j}}{r_{k,k}^{j}}(\hat{U}_{n,j})_i\right], \quad \text{(Equation 19)}$$
$$k = L, L-1, \ldots, \text{ and } 1$$

At this time, $dec[\cdot]$ denotes the decoding operator, and $r_{k,k}^{i,n}$ denotes the estimated crosstalk between users k and j and intersymbol interference between symbols i and n, At each timing, the symbol employing a user domain is decoded, and the interference-free symbol is obtained by using the G-DFE in the time domain with several intermediate samples $$\left(\hat{S}_{i,n}\right)_k.$$

As compared with the one-dimensional G-DFE structure, an operation is enhanced in the two-dimensional DFE structure, thereby canceling out the crosstalk at the timing instant of the received symbol. However, this scheme cannot suppress the crosstalk that is not timing-aligned to the received symbol.

Figure 3:
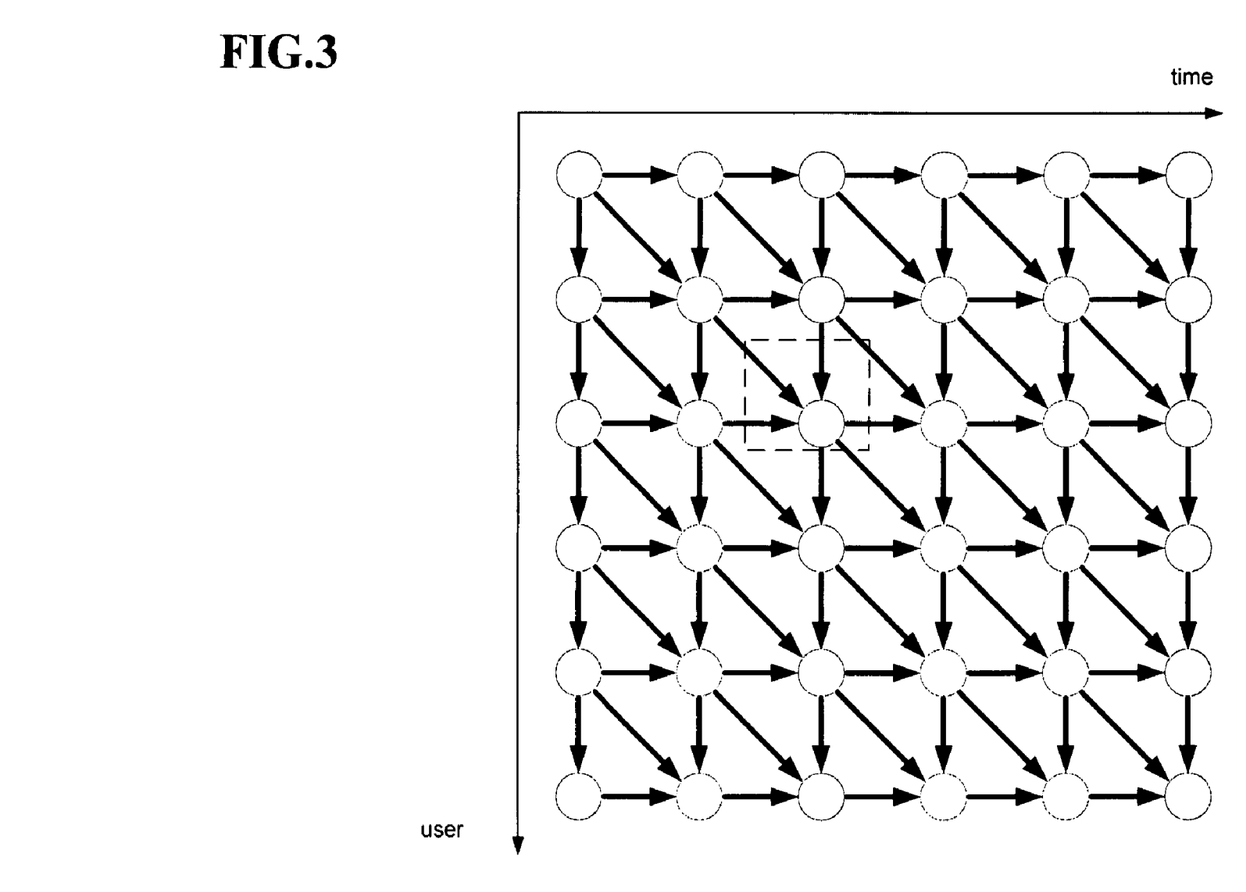
FIG. 3 is a second schematic view illustrating a two-dimensional DFE according to an exemplary embodiment of the present invention.

In order to suppress crosstalk symbols that are distant multi-symbols from the detected symbol, the exemplary embodiment of the present invention provides a two-dimensional DFE that analyzes a channel located at a diagonal line, as shown in FIG. 3.

FIG. 3 is a second schematic view illustrating a two-dimensional DFE according to an exemplary embodiment of the present invention.

As shown in FIG. 3, for diagonal channel analysis, it is also required to decompose the MIMO channel that is timing-misaligned by users. The proposed M-D DFE can simultaneously suppress the interference and crosstalk by sequential processing, as represented by Equation 20. At this time, k is a natural number in a range of 1 to L and n is a natural number in a range of 1 to M.

$$\left(U_{n,k}\right)_i = dec\left[\frac{1}{r_{k,k}^{j}}(\tilde{Z}_i)_k - \sum_{l=n+1}^{M}\sum_{j=k+1}^{L} \frac{r_{k,j}^{j}}{r_{k,k}^{j}}(\hat{U}_{n,j})_i\right] \quad \text{(Equation 20)}$$

In this case, multiple summations represented by Equation 20 represent two-dimensional feedback operations.

Figure 4:
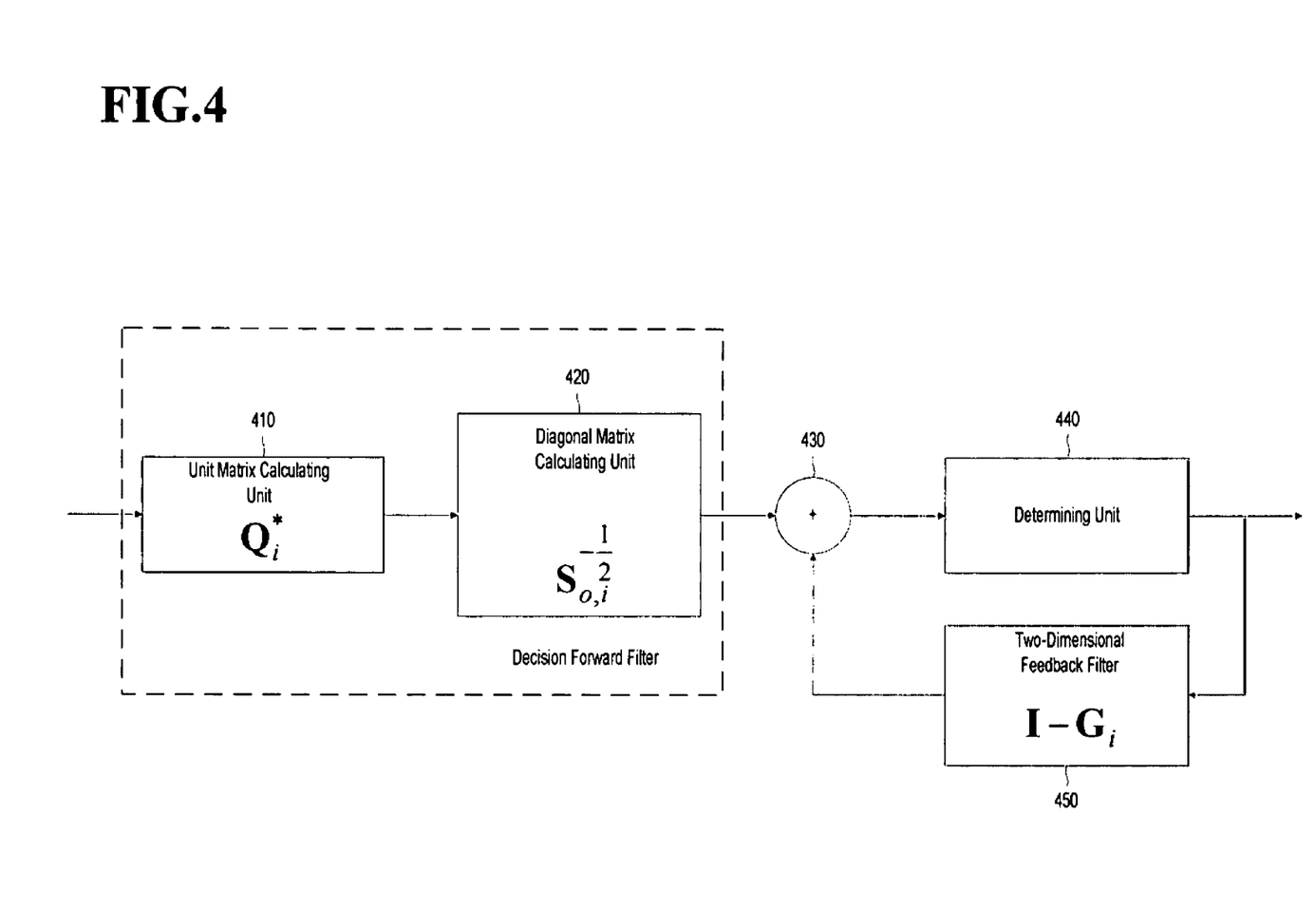
FIG. 4 is a block diagram illustrating a structure of a multi-dimensional decision-feedback equalizer (M-D DFE) according to a first exemplary embodiment of the present invention.

FIG. 4 is a block diagram illustrating an M-D DFE according to a first exemplary embodiment of the present invention.

The M-D DFE according to the exemplary embodiment of the present invention includes a unit matrix calculating unit 410, a diagonal matrix calculating unit 420, an adder 430, a determining unit 440, and a two-dimensional feedback filter 450.

The unit matrix calculating unit 410 calculates $Q_i^*$ (i=1, 2, ..., N) to be a transposed matrix of a unit matrix from a received signal, and the diagonal matrix calculating unit 420 calculates $S_{o,i}^{1/2}$ as a diagonal matrix having a positive element. In this case, the unit matrix calculating unit 410 and the diagonal matrix calculating unit 420 perform the same function as the decision forward filter 142 of the G-DFE according to the related art, and thus may be implemented by the decision forward filter 142 according to the related art.

Further, the adder 430 of the M-D DFE according to the exemplary embodiment of the present invention performs a function of adding the signal by the diagonal matrix calculating unit 420 and the feedback signal transmitted from the two-dimensional feedback filter 450, and the determining unit 440 performs a function of calculating a data vector u transmitted from the transmitting terminal according to the signal transmitted from the adder 144.

The data vector that is calculated by the determining unit 440 is transmitted to the adder 430 through the two-dimensional feedback filter 450. At this time, the two-dimensional feedback filter 450 has a calculated value of $I-G_i$, and the feedback operation $(U_{n,k})_i$ described in FIGS. 2 and 3 is performed.

Here, the two-dimensional feedback filter 450 can be implemented by various multi-dimensional feedback filters according to a feedback operation method.

Figure 5:
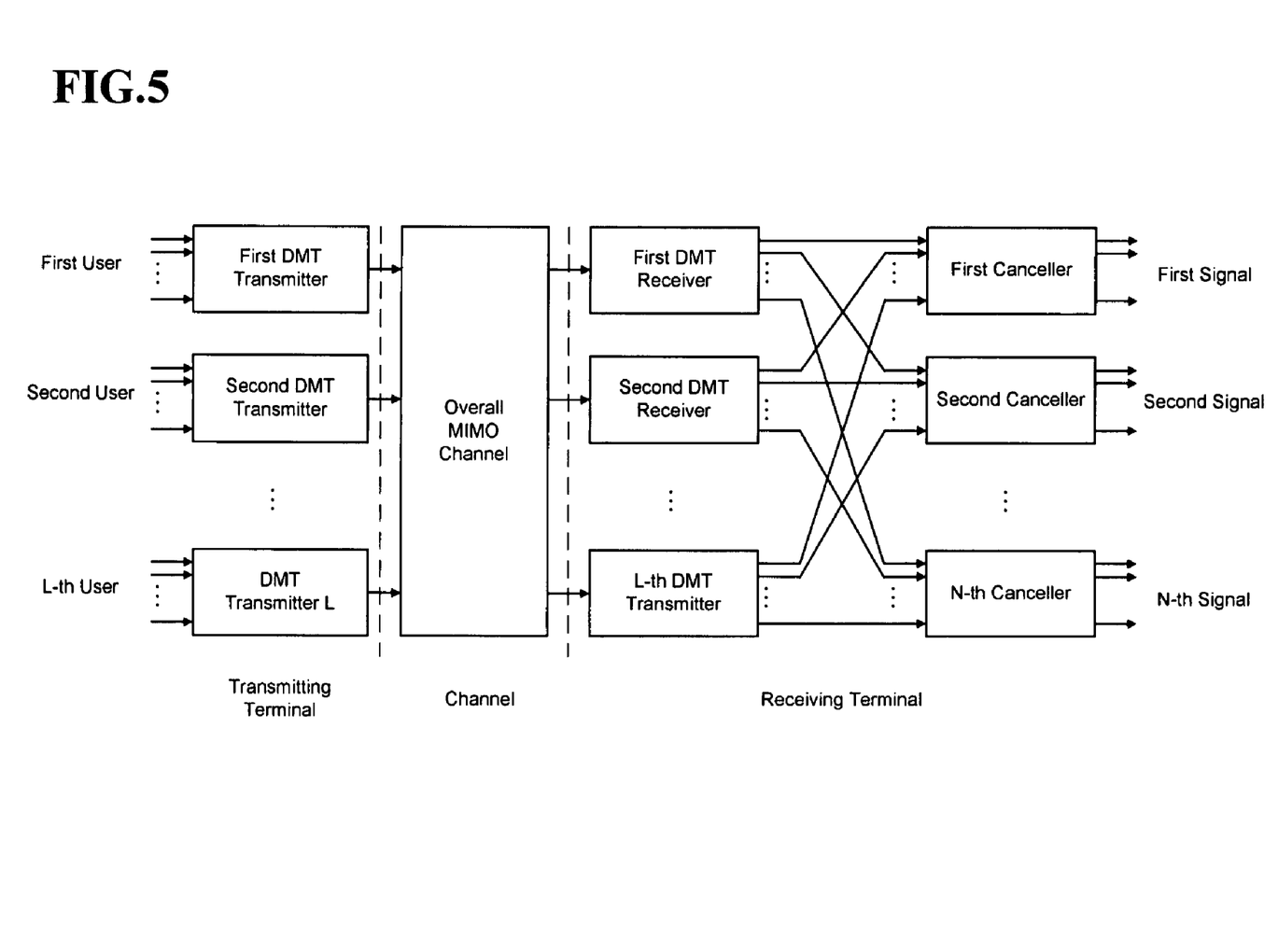
FIG. 5 is a block diagram illustrating a matched structure of a multi-user transmission system using a multi-dimensional decision-feedback equalizer (M-D DFE) according to a first exemplary embodiment of the present invention.

FIG. 5 is a diagram illustrating a matched structure of a multi-user transmission system using an M-D DFE according to a first exemplary embodiment of the present invention.

The multi-user transmission system to which the M-D DFE according to the exemplary embodiment of the present invention is applied transmits a signal through the MIMO channel. In order to use a MIMO scheme, the transmitting terminal includes a plurality of DMT transmitters, and the receiving terminal includes a plurality of DMT receivers. In the multi-user transmission system, a plurality of cancellers are included in order to cancel out an interference signal contained in each of the signals that have been received through the plurality of DMT receivers.

The first transmission signal from the first user is transmitted to the MIMO channel through the first DMT transmitter, the second transmission signal from the second user is transmitted to the MIMO channel, and the L-th transmission signal from the L-th user is transmitted to the MIMO channel through the L-th DMT transmitter.

That is, the first to L-th transmission signals are transmitted to the first to L-th DMT receivers through the MIMO channel, respectively. The first to L-th received signals that are respectively received through the first to L-th DMT receivers are transmitted to the first to N-th cancellers, respectively. At this time, the number N of cancellers may be equal to the number L of transmitted signals, and may be different from the number L of transmitted signals. The first to N-th cancellers cancel out the interference signals from the first to L-th received signals received through the first to L-th DMT receivers, respectively, and extract the first to N-th signals, respectively. In this case, it is preferable that the first to N-th signals be equal to the first to L-th transmission signals.

Meanwhile, a method of canceling the crosstalk signals using the multi-dimensional coordination and vector transmission may be implemented with the M-D precoder rather than with a method using the M-D DFE.

The MIMO channel can be analyzed by the matched transmitter in a time domain and a user domain. With 2-D Cholesky factorization, the consecutive substitution can be performed as shown in FIG. 2. Therefore, a signal sample $$(\hat{S}_{i,n})_k$$

and a feedback method $(U_{n,k})_i$ represented as Equations 19 and 20 can be substituted as Equations 21 and 22. In this case, $$(\hat{S}_{i,n})_k$$

denotes an intermediate sample after the time domain preceding.

$$(U_{n,k})_i = \Gamma_M \left[ \frac{1}{r_{k,k}^i} (\hat{S}_i)_k - \sum_{j=k+1}^{L} \frac{r_{k,j}^i}{r_{k,k}^i} (\hat{U}_{n,j})_i \right], \quad \text{(Equation 21)}$$

$$k = L, L-1, \ldots, \text{and } 1$$

$$(\hat{S}_{i,n})_k = \Gamma_M \left[ \frac{1}{r_{k,k}^{i,n}} (\tilde{Z}_{i,n})_k - \sum_{j=n+1}^{M} \frac{r_{k,j}^{i,n}}{r_{k,k}^{i,n}} (\hat{S}_{i,j})_k \right], \quad \text{(Equation 22)}$$

$$n = M, M-1, \ldots, \text{and } 1$$

In this case, $\Gamma_M[\cdot]$ denotes the module operation in Tomlinson-Harashima preceding (TH precoding). TH preceding is a processing method for upper transmission. In addition, $r_{k,k}^{i,n}$ denotes the estimated crosstalk between users k and j and an inter-symbol interference function between symbols I and j. Similar to the matched receiver, the signal is first precoded in the time domain, and is then precoded in the user domain. In this process, the signal becomes a purposely crosstalk-contaminated signal.

Therefore, the inter-symbol interference (ISI) and the crosstalk are cancelled out by continuous processes through the M-D precoding, and this method can be represented as Equation 23.

$$(U_{n,k})_i = \Gamma_M \left[ \frac{1}{r_{k,k}^i} (\tilde{Z}_i)_k - \sum_{i=n+1}^{M} \sum_{j=k+1}^{L} \frac{r_{k,j}^i}{r_{k,k}^i} (\hat{U}_{n,j})_i \right], \quad \text{(Equation 23)}$$

$$k = L, \ldots, \text{and } 1,$$

and n=M, ..., and 1.

Figure 6:
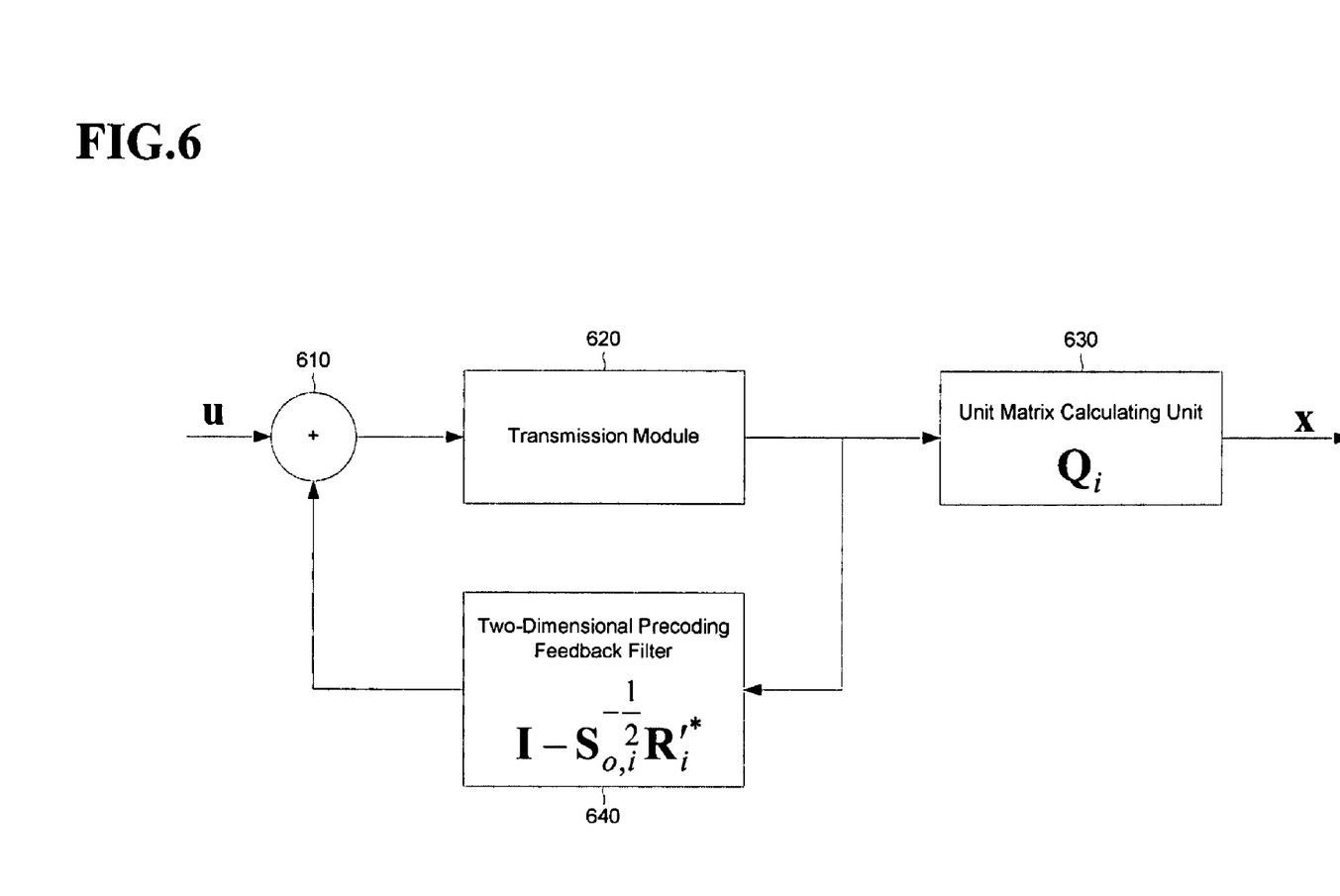
FIG. 6 a block diagram illustrating a structure of an M-D precoder according to a second exemplary embodiment of the present invention.

FIG. 6 is a block diagram illustrating a structure of an MD-precoder according to a second exemplary embodiment of the present invention.

The M-D DFE according to the second exemplary embodiment of the present invention includes an adder 610, a transmission module 620, a unit matrix calculating unit 630, and a two-dimensional preceding feedback filter 640.

The adder 610 performs functions with an input data vector u and signal feedback through the two-dimensional precoding feedback filter 640, and transmits an added result to the transmission module 620. At the time of an initial operation, the adder 610 transmits only the input data vector u to the transmission module 620, and if the signal is fed back from the two-dimensional precoding feedback filter 640, the adder 610 adds the signal and a subsequently input data vector and transmits the added result to the transmission module 620.

The transmission module 620 performs a function of calculating the transmitted signal according to the sum between the data vector transmitted from the adder 610 and the feedback signal. In this case, the transmission module 620 multiplies the data vector transmitted from the adder 610 by the pre-distortion matrix A so as to calculate the transmitted signal.

The unit matrix calculating unit 630 multiplies the signal transmitted from the transmission module 620 by the unit matrix $Q_i$ so as to calculate a transmission signal x to be transmitted through the channel.

The two-dimensional precoding feedback filter 640 performs functions of performing M-D precoding according to Equation 23 so as to cancel the inter-symbol interference and the crosstalk from the signal calculated from the transmission module 620 and causing the signal to be fed back to the adder 610.

The M-D precoder that has the above-described structure is located at a front stage of the transmitter, and performs a function of canceling the inter-symbol interference and the crosstalk from the transmitted signal.

Figure 7:
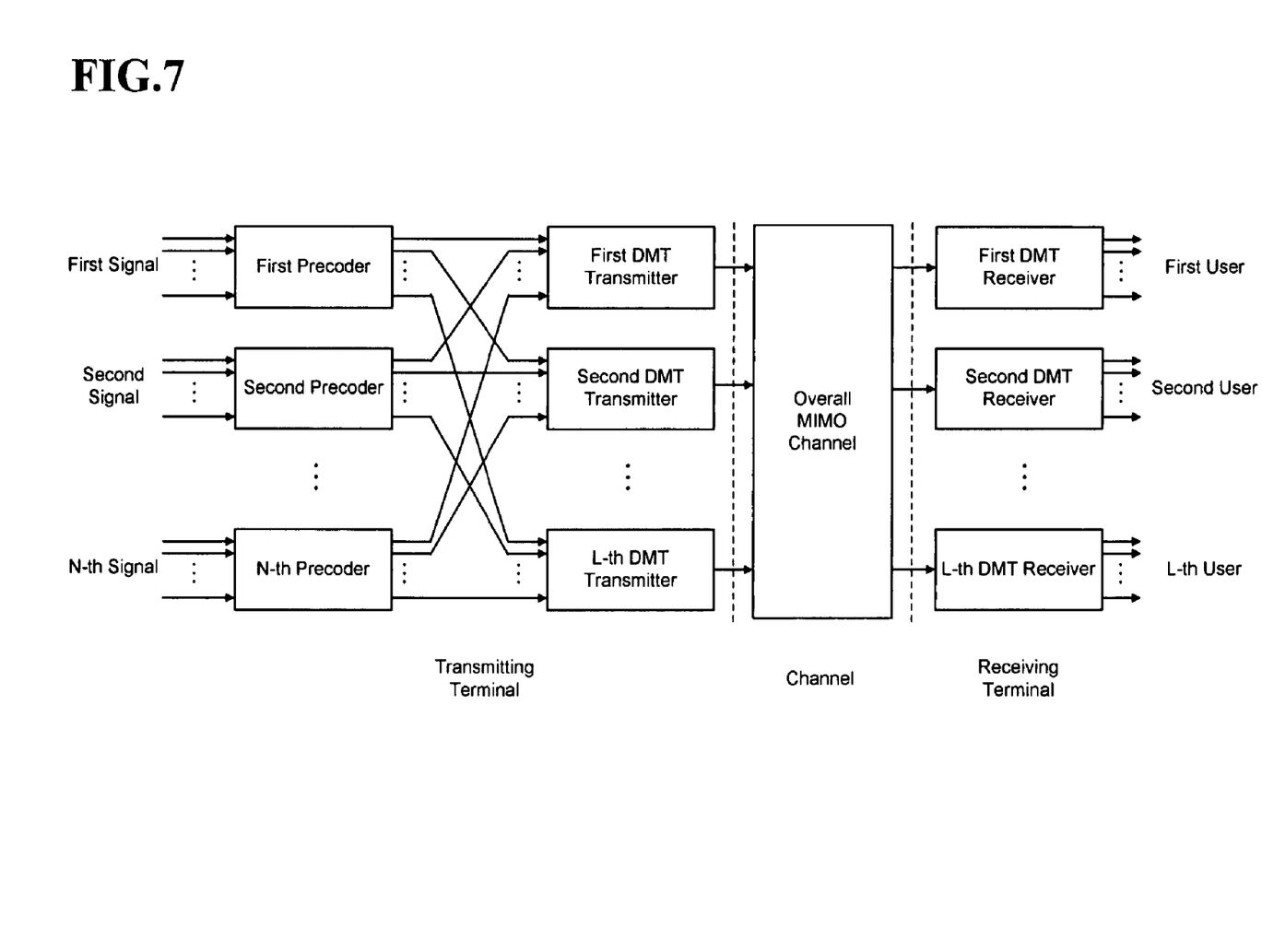
FIG. 7 is a block diagram illustrating a matched structure of a multi-user transmission system using an M-D precoder according to a second exemplary embodiment of the present invention.

FIG. 7 is a diagram illustrating a matched filter of a multi-user transmission system using an M-D precoder according to a second exemplary embodiment of the present invention.

The multi-user transmission system to which the M-D precoder according to the second exemplary embodiment of the present invention is applied transmits a signal through the MIMO channel. The transmitting terminal that transmits the transmission signal using the MIMO scheme includes a plurality of M-D precoders and a plurality of DMT transmitters for canceling the crosstalk signals. In addition, the receiving terminal that receives the signal transmitted through the MIMO channel includes a plurality of DMT receivers.

The first to N-th signals are input to the first to N-th precoders, respectively. The first to N-th precoders precode the respective input signals in the time domain and the user domain, and then perform a process for canceling the inter-symbol interference and the crosstalk.

The signals from which the inter-symbol interference and the crosstalk are completely cancelled are transmitted to the first to L-th DMT transmitters, respectively. That is, the first to L-th DMT transmitters receive the plurality of signals transmitted from the first to L-th precoders, generate the first to L-th transmission signals, and transmit them to the MIMO channel. The first to L-th transmission signals that have been transmitted to the MIMO channel are transmitted to the first to L-th DMT receivers, respectively.

The method of canceling the crosstalk signals using the M-D DFE and the M-D precoder that has been described above can be proven by computer simulation. If the simulation is performed by a computer, it can be confirmed that the method of canceling the cross-talk signals using the M-D DFE and the M-D precoder according to the exemplary embodiments of the present invention is very efficient in a circumference where near-end crosstalk occurs.

The above-described exemplary embodiments are not only implemented by the method and the apparatus, but may be implemented by a program executing a function corresponding to the structure according to the exemplary embodiments of the present invention or a recording medium where the corresponding program is recorded. This implementation can be easily implemented by those skilled in the present invention from the above-described exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, according to the exemplary embodiments of the present invention, vector transmission and multi-dimensional cable coordination are applied to the DFE or the precoding through a sequential operation in time and space, which cancels near-end crosstalk (NEXT) and far-end crosstalk (FEXT) regardless of a type of cable line.

Further, since it can be confirmed whether the cable line is in a busy state or an idle state, it is possible to reduce computer work in a central system that manages cable lines, which increases cable capacity for data transmission.

What is claimed is:

1. A method of canceling crosstalk signals in a receiver that receives data vectors transmitted from a transmitter and received signals including the crosstalk signals generated during the transmission of the data vectors, the method comprising:
   (a) a step of multi-dimensionally decomposing the received signals into a user domain and a time domain;
   (b) a step of calculating a transposed matrix and a diagonal matrix of a unit matrix from the received signals;
   (c) a step of decoding the received signals with respect to symbols in the user domain using the transposed matrix and the diagonal matrix of the unit matrix; and
   (d) a step of decoding the signals, which have already been decoded in the user domain with respect to symbols, in the time domain so as to calculate the data vectors from which the crosstalk signals are cancelled;
   wherein in the step of (d), decoding through a diagonal channel analysis of the user domain and the time domain is performed, in addition to the decoding through the user domain and the decoding through the time domain.

2. The method of claim 1, further comprising:
   (e) a step of making the data vectors from which the crosstalk signals are cancelled feedback, and adding the feedback data vectors and input received signals so as to generate second received signals; and
   (f) a step of repeating the processes after the step of (c) on the second received signals.

3. The method of claim 1, wherein, in the step of (c), the received signals are decoded with respect to the user domain using the following equation:

$$(\hat{S}_{i,n})_k = dec\left[\frac{1}{r_{k,k}^{i,n}}(\tilde{Z}_{i,n})_k - \sum_{j=n+1}^{M} \frac{r_{k,j}^{i,n}}{r_{k,k}^{i,n}}(\hat{S}_{i,j})_k\right], n = T, T-1, \ldots, \text{and } 1$$

(where $$\left(\hat{S}i, n\right)_k$$

denotes a signal sample decoded in the user domain, dec[·] denotes a decoding operator, $r_{k,k}^{i,n}$ denotes estimated crosstalk between users k and j and inter-symbol interference between symbols I and j, $\tilde{Z}_{i,n}$ denotes the received signal, T denotes the number of taps included in the received signals, and n is a natural number in a range of 1 to M).

4. The method of claim 3, wherein in the step of (f), data vectors on the second received signal are calculated using the following equation:

$$(U_{n,k})_i = dec\left[\frac{1}{r^i_{k,k}}(\hat{S}_i)_k - \sum_{j=k+1}^{L} \frac{r^i_{k,j}}{r^i_{k,k}}(\hat{U}_{n,j})_i\right], \quad k = L, L-1, \ldots, \text{and } 1$$

(where $$(\hat{U}_{n,j})_i$$

denotes a data vector calculated by the step of (d), $(U_{n,k})_i$ denotes a data vector calculated by the step of (f), and k is a natural number in a range of 1 to L).

5. A method of canceling crosstalk signals in a receiver that receives data vectors transmitted from a transmitter and received signals including the crosstalk signals generated during the transmission of the data vectors, the method comprising:
   (a) a step of multi-dimensionally decomposing the received signals into a user domain and a time domain;
   (b) a step of calculating a transposed matrix and a diagonal matrix of a unit matrix from the received signals;
   (c) a step of decoding the received signals with respect to symbols taking the user domain using the transposed matrix and the diagonal matrix of the unit matrix;
   (d) a step of decoding the signal decoded in the user domain with respect to symbols taking the time domain so as to calculate the data vectors from which the crosstalk signals are cancelled;
   (e) a step of making the data vectors from which the crosstalk signals are cancelled feedback, and adding the feedback data vectors and input received signals so as to generate second received signals; and
   (f) a step of repeating the processes after the step of (c) on the second received signals;
   wherein in the step of (f), data vectors on the second received signals are calculated using the following equation:

$$(U_{n,k})_i = dec\left[\frac{1}{r^i_{k,k}}(\tilde{Z}_i)_k - \sum_{l=n+1}^{M}\sum_{j=k+1}^{L} \frac{r^i_{k,j}}{r^i_{k,k}}(\hat{U}_{n,j})_i\right]$$

(where $$(\hat{U}_{n,j})_i$$

denotes a data vector calculated by the step of (d), $(U_{n,k})_i$ denotes a data vector calculated by the step of (f), $r^i_{k,j}$ denotes estimated crosstalk between users k and j and inter-symbol between symbols I and j, $\tilde{Z}_{i,n}$ denotes the received signal, n denotes a natural number in a range of 1 to M, and k is a natural number in a range of 1 to L).

6. The method of claim 1, wherein in the step of (a), the received signals are multi-dimensionally decomposed into the user domain and the time domain through Cholesky factorization.

7. A canceller for canceling crosstalk signals in a receiver that receives data vectors transmitted from a transmitter and received signals including the crosstalk signals generated during the transmission of the data vectors, the canceller comprising:
   a decision forward filter that calculates a transposed matrix and a diagonal matrix of a unit matrix from the received signals;
   a determining unit that calculates the data vectors included in the received signals using the transposed matrix and the diagonal matrix of the unit matrix;
   a feedback filter that causes the data vector calculated by the determining unit to be fed back; and
   an adder that adds the data vectors fed back through the feedback filter and the received signals transmitted from the decision forward filter, and transmits the added value to the determining unit;
   wherein the determining unit decodes the received signals in the user domain first using the transposed matrix and the diagonal matrix of the unit matrix, then decodes the received signals in the time domain, and calculates the data vectors from which the crosstalk signals are cancelled; and
   wherein the determining unit performs decoding through a diagonal channel analysis of the user domain and the time domain, in addition to the decoding through the user domain and the decoding through the time domain.

8. The canceller of claim 7, wherein the decision forward filter includes:
   a unit matrix calculating unit that calculates the transposed matrix of the unit matrix from the received signals; and
   a diagonal matrix calculating unit that calculates the diagonal matrix having positive elements from the received signals.

9. A multi-user transmission system that cancels crosstalk signals generated during the transmission of signals using a multi-dimensional decision feedback equalizer (DCE), the system comprising:
   a plurality of discrete multi-tone (DMT) transmitters that transmit a plurality of transmission signals including data vectors input from a plurality of users through a transmission channel;
   a plurality of DMT receivers that receive a plurality of received signals from the transmission channel, the plurality of received signals including the plurality of transmission signals transmitted from the plurality of DMT transmitters and the crosstalk signals generated during the transmission of the plurality of transmission signals; and
   a plurality of cancellers that cancel the crosstalk signals from the plurality of received signals so as to calculate the data vectors;
   wherein each of said cancellers comprises:
   a decision forward filter that calculates a transposed matrix and a diagonal matrix of a unit matrix from the received signals;
   a determining unit that calculates the data vectors included in the received signals using the transposed matrix and the diagonal matrix of the unit matrix;
   a feedback filter that causes the data vector calculated by the determining unit to be fed back; and an adder that adds the data vectors fed back through the feedback filter and the received signals transmitted from the decision forward filter, and transmits the added value to the determining unit;

wherein the determining unit decodes the received signals in the user domain first using the transposed matrix and the diagonal matrix of the unit matrix, then decodes the received signals in the time domain, and calculates the data vectors from which the crosstalk signals are cancelled; and wherein the determining unit performs decoding through a diagonal channel analysis of the user domain and the time domain, in addition to the decoding through the user domain and the decoding through the time domain.

10. The system of claim 9, wherein the transmission signals transmitted from the plurality of DMT transmitters are transmitted to the plurality of DMT receivers through a multi input multi output (MIMO) channel.

11. The system of claim 9, wherein the cancellers perform a feedback operation on the plurality of received signals transmitted from the plurality of DMT receivers so as to calculate the data vectors included in the transmission signals.

12. The system of claim 11, wherein, in the feedback operation, the plurality of received signals are decoded in the user domain and decoded in the time domain so as to calculate the data vectors from which the crosstalk signals are cancelled.

13. A method of canceling crosstalk signals that are generated during the transmission of data vectors from a transmitter to a receiver, the method comprising:

(a) a step of multiplying the data vectors to be transmitted from a pre-distortion matrix so as to calculate transmission signals;

(b) a step of multi-dimensionally decomposing the transmission signals into a time domain and a user domain;

(c) a step of precoding the transmission signals in the time domain first and then precoding the transmission signals in the user domain;

(d) a step of multiplying the signals precoded in the time domain and the user domain by the pre-distortion matrix so as to calculate second transmission signals; and (e) a step of multiplying the second transmission signals by the unit matrix and transmitting the result to the receiver;

wherein in the step of (c), precoding through a diagonal channel analysis of the user domain and the time domain is performed, in addition to the precoding through the user domain and the precoding through the time domain.

14. The method of claim 13, wherein, in the step of (e), after multiplying the second transmission signals by the unit matrix, the result is transmitted to the receiver, and the processes after the step of (b) are repeated using the second transmission signals.

15. A method of canceling crosstalk signals that are generated during the transmission of data vectors from a transmitter to a receiver, the method comprising:

(a) a step of multiplying the data vectors to be transmitted from a pre-distortion matrix so as to calculate transmission signals;

(b) a step of multi-dimensionally decomposing the transmission signals into a time domain and a user domain;

(c) a step of precoding the transmission signals in the time domain and precoding the transmission signals in the user domain;

(d) a step of multiplying the signals precoded in the time domain and the user domain by the pre-distortion matrix so as to calculate second transmission signals; and (e) a step of multiplying the second transmission signals by the unit matrix and transmitting the result to the receiver;

wherein, in the step of (c), the transmission signals are precoded in the time domain using the following equation:

$$(\hat{S}_{i,n})_k = \Gamma_M\left[\frac{1}{r_{k,k}^{i,n}}(\tilde{Z}_{i,n})_k - \sum_{j=n+1}^{M} \frac{r_{k,j}^{i,n}}{r_{k,k}^{i,n}}(\hat{S}_{i,j})_k\right], \; n = M, M-1, \ldots, \text{and } 1$$

(where $$\left(\hat{S}i,n\right)_k$$

denotes a signal sample precoded in the time domain, $\Gamma_M[\cdot]$ denotes a precoding operator, $r_{k,k}^{i,n}$ denotes estimated crosstalk between users k and j and inter-symbol interference between symbols I and j, $\tilde{Z}_{i,n}$ denotes a received signal in the receiver, and n is a natural number in a range of 1 to M).

16. The method of claim 15, wherein, in the step of (c), the signal precoded in the time domain is precoded in the user domain using the following equation:

$$(U_{n,k})_i = \Gamma_M\left[\frac{1}{r_{k,k}^i}(\tilde{S}_i)_k - \sum_{j=k+1}^{l} \frac{r_{k,j}^i}{r_{k,k}^i}(\hat{U}_{n,j})_i\right], \; k = L, L-1, \ldots, 1$$

(where $$(\hat{U}_{n,j})_i$$

denotes a data vector precoded in time domain and the user domain, $(U_{n,k})_i$ denotes a data vector to be transmitted, and k is a natural number in a range of 1 to L).

17. A method of canceling crosstalk signals that are generated during the transmission of data vectors from a transmitter to a receiver, the method comprising:

(a) a step of multiplying the data vectors to be transmitted from a pre-distortion matrix so as to calculate transmission signals;

(b) a step of multi-dimensionally decomposing the transmission signals into a time domain and a user domain;

(c) a step of precoding the transmission signals in the time domain and precoding the transmission signals in the user domain;

(d) a step of multiplying the signals precoded in the time domain and the user domain by the pre-distortion matrix so as to calculate second transmission signals; and (e) a step of multiplying the second transmission signals by the unit matrix and transmitting the result to the receiver;

wherein, in the step of (c), precoding through the time domain, precoding through the user domain and precoding through a diagonal channel analysis in the time domain and the user domain are performed so as to calculate transmission signals for cancellation of the crosstalk signals;

wherein, in the step of (c), precoding through the time domain, precoding through the user domain and precoding through a diagonal channel analysis in the time domain and the user domain are performed using the following Equation $$(U_{n,k})_i = \Gamma_M \left[ \frac{1}{r^i_{k,k}} (\tilde{Z}_i)_k - \sum_{i=n+1}^{M} \sum_{j=k+1}^{L} \frac{r^i_{k,j}}{r^i_{k,k}} (\hat{U}_{n,j})_i \right], \quad k = L, \ldots, \text{ and } n = M$$

(where $$(\hat{U}_{n,j})_i$$

denotes a data vector precoded in the time domain and the user domain, $(U_{n,k})_i$ denotes a data vector to be transmitted, $r_{k,j}{}^i$ denotes estimated crosstalk between users k and j and inter-symbol interference between symbols I and j, the $\tilde{Z}_{i,n}$ denotes a received signal in the receiver, n is a natural number in a range of 1 to L, and k is a natural number in a range of 1 to L).

18. A multi-dimensional precoder for a transmitter that cancels crosstalk signals generated during transmission of data vectors to a receiver, the precoder comprising:
a transmission module that multiplies the data vectors to be transmitted from a pre-distortion matrix so as to calculate transmission signals;
a unit matrix calculating unit that multiplies the transmission signals transmitted from the transmission module by the unit matrix so as to calculate the transmission signals transmitted to the receiver;
a precoding feedback filter that performs multi-dimensional precoding on the transmission signals calculated by the transmission module so as to generate feedback signals for cancellation of the crosstalk signals; and
an adder that adds the feedback signals transmitted from the precoding feedback filter and input data vectors and transmits the result to the transmission module;
wherein the precoding feedback filter multi-dimensionally decomposes the transmission signals into the time domain and the user domain, precodes the transmission signals in the time domain first, then precodes the transmission signals in the user domain, and generates the feedback signals; and
wherein the precoding feedback filter performs precoding through a diagonal channel analysis of the user domain and the time domain, in addition to the precoding through the user domain and the precoding through the time domain.

19. A multi-user transmission system that cancels crosstalk signals generated during the transmission of signals, the system comprising:
a plurality of multi-dimensional precoders that receive input data vectors and perform a process for canceling the crosstalk signals generated during the transmission of the data vectors;
a plurality of discrete multi-tone (DMT) transmitters that receive the signals having been subjected to the crosstalk signal canceling process from the plurality of precoders so as to generate transmission signals, and transmit the transmission signals through a transmission channel; and
a plurality of DMT receivers that receive the plurality of transmission signals transmitted through the transmission channel so as to calculate the data vectors;
wherein each of said precoders comprises:
a transmission module that multiplies the data vectors to be transmitted from a pre-distortion matrix so as to calculate transmission signals;
a unit matrix calculating unit that multiplies the transmission signals transmitted from the transmission module by the unit matrix so as to calculate the transmission signals transmitted to the receiver;
a precoding feedback filter that performs multi-dimensional precoding on the transmission signals calculated by the transmission module so as to generate feedback signals for cancellation of the crosstalk signals; and
an adder that adds the feedback signals transmitted from the precoding feedback filter and input data vectors and transmits the result to the transmission module;
wherein the precoding feedback filter multi-dimensionally decomposes the transmission signals into the time domain and the user domain, precodes the transmission signals in the time domain first, then precodes the transmission signals in the user domain, and generates the feedback signals; and
wherein the precoding feedback filter performs precoding through a diagonal channel analysis of the user domain and the time domain, in addition to the precoding through the user domain and the precoding through the time domain.

20. The system of claim 19, wherein the transmission signals transmitted from the plurality of DMT transmitters are transmitted to the plurality of DMT receivers through a multi input multi output (MIMO) channel.

* * * * *